July 7, 1964
R. D. RUMSEY
3,140,080
FRICTION SNUBBER WITH TWO-WAY BUMP STOP
Filed Dec. 12, 1962
2 Sheets-Sheet 1
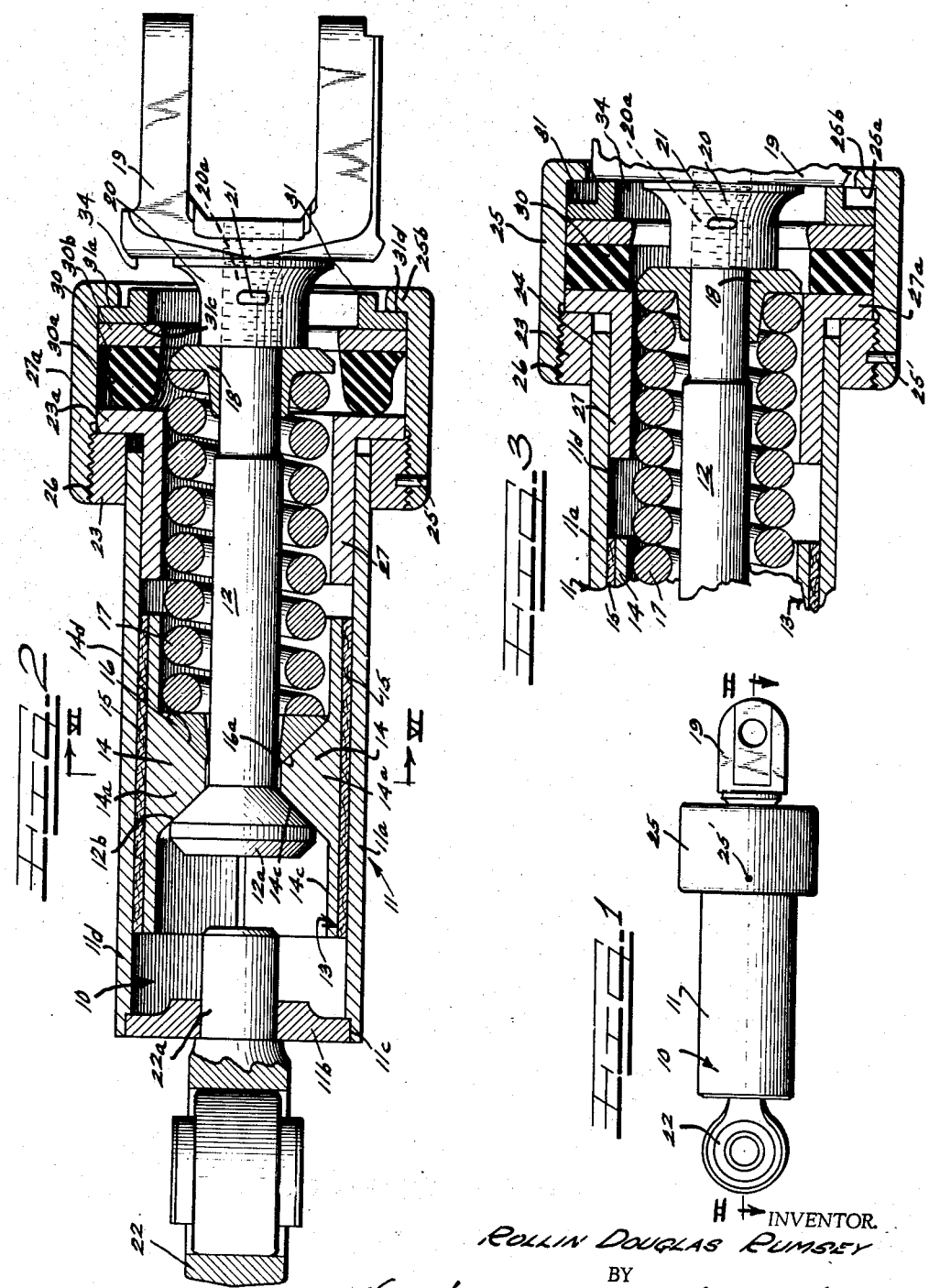
INVENTOR.
ROLLIN DOUGLAS RUMSEY
BY
ATTORNEYS July 7, 1964
R. D. RUMSEY
3,140,080
FRICTION SNUBBER WITH TWO-WAY BUMP STOP
Filed Dec. 12, 1962
2 Sheets-Sheet 2
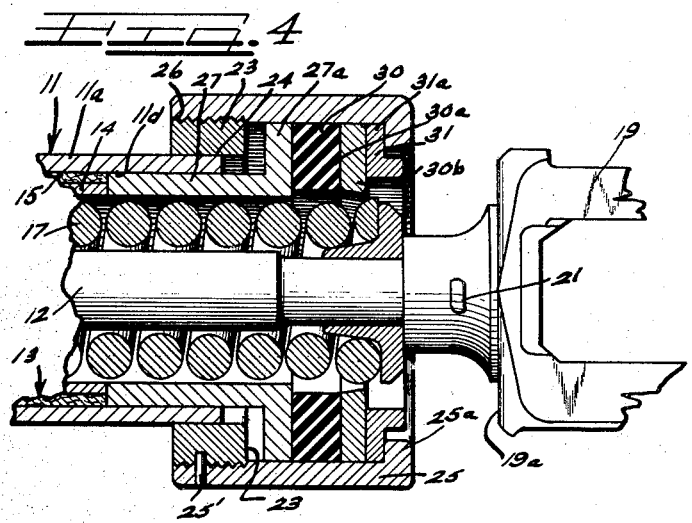
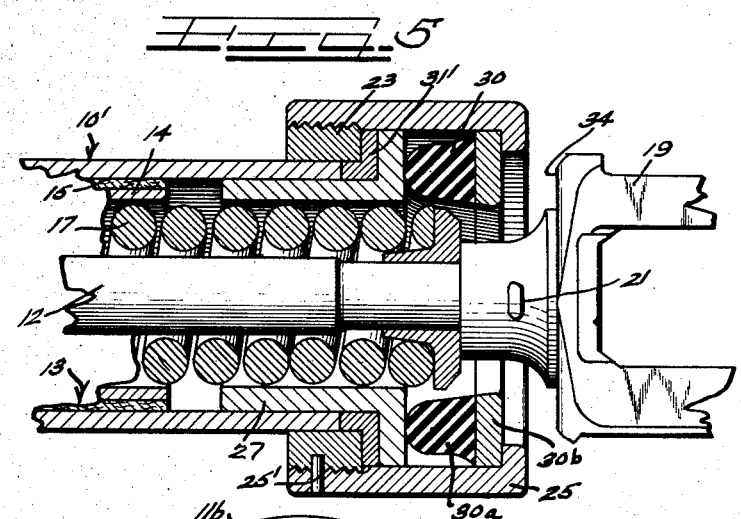
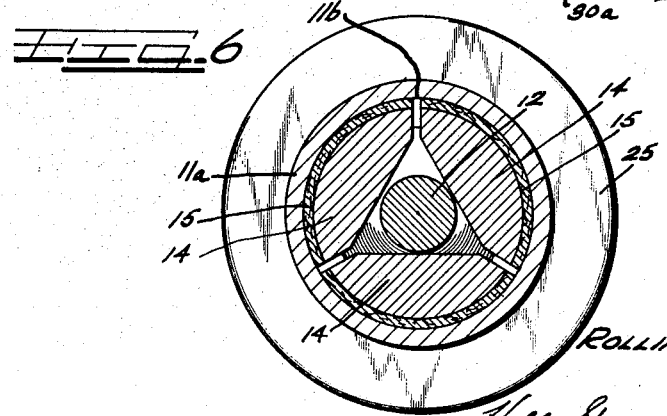
INVENTOR.
ROLLIN DOUGLAS RUMSEY
BY
ATTORNEYS United States Patent Office 3,140,080
Patented July 7, 1964

3,140,080
FRICTION SNUBBER WITH TWO-WAY
BUMP STOP
Rollin Douglas Rumsey, Buffalo, N.Y., assignor to Houdaille Industries, Inc., Buffalo, N.Y., a corporation of Michigan
Filed Dec. 12, 1962, Ser. No. 244,137
10 Claims. (Cl. 267—1)

The present invention relates generally to vibration dampening means or a friction type snubber unit. More specifically, it relates to a snubber unit adapted for connection between a pair of relatively movable elements such as on a railway car truck and the like. This invention is an improvement on a device such as is disclosed in the U.S. Patent No. 2,574,788. The snubber can be used on a locomotive, on earthmoving machinery, farm machinery, and other types of apparatus where snubbing action is required.

According to the present invention, a resilient bumper ring is built into the snubber and the resilient bumper ring is double acting in that it functions to dampen compression forces and outward forces applied to a plunger rod mounted within the snubber.

According to still other important features of this invention, the snubber has means for adjusting the stroke of the plunger rod to vary the distance which the plunger rod must travel before the resilient bumper ring or stop dampens further movement of the plunger rod.

It is, therefore, a most important object of this invention to provide a new and improved snubber having a resilient bump stop for dampening pull-out and compression forces applied to the snubber.

Still another important object is to provide a new and improved friction snubber which can be economically manufactured and wherein its components can be readily assembled and are of a rugged construction enabling the snubber to be used for long periods without requiring service.

Still another important object of this invention is to provide a new and improved snubber having a built-in resilient bumper ring which functions as a two-way bump stop.

Other objects and features of this invention will more fully become apparent in view of the following detailed description taken in conjunction with the accompanying drawings illustrating therein several embodiments and in which:

FIGURE 1 is a side elevation of a friction type snubber.

FIGURE 2 is an enlarged partially sectioned view of the snubber shown in FIGURE 1;

FIGURE 3 is an enlarged fragmentary cross-sectional view illustrating the plunger rod in a compressed position;

FIGURE 4 is an enlarged fragmentary cross-sectional view illustrating the plunger rod in its extended position;

FIGURE 5 is an enlarged cross-sectional view similar to FIGURE 2, only illustrating a modified type of snubber; and FIGURE 6 is an enlarged vertical section taken substantially on the line VI—VI looking in the direction indicated by the arrows as shown in FIGURE 2.

As shown on the drawings:

The reference character 10 designates generally a friction snubber having a cup-shaped casing 11 including a cylindrical casing wall 11a and an end closure ring or portion 11b which is welded at 11c in assembly with the casing wall 11b.

Mounted co-axially within the casing 11 is a plunger rod 12. Means designated generally at 13 is provided for dampening the longitudinal movement of the plunger rod 12 with respect to the casing 11. The means 13 includes three segmental-shell-like friction shoes (see FIGURE 6) which shoes 14 are preferably formed of metal. Bonded to the radially outer surfaces of the shoes 14 are suitable friction facings 15 which are adapted to be forced into engagement with the interior surface 11d of the casing 11. These friction facings 15 may be of non-metallic material such as conventional clutch or brake-lining material. Each shoe 14 has a wedge portion 14a with opposed, flat, inclined, converging surfaces 14c and 14d projecting from the inner cylindrical surface 14e of the shoe 14.

The plunger rod 12 has a plunger head or inner end 12a provided with an annular, flat, inclined surface 12b which is in mated engagement with the three converging shoe surfaces 14c on the three shoes 14. It will be noted that the plunger rod head 12a is disposed on one side of the wedge portion 14a and that a wedge ring 16 is disposed on an opposite side of the wedge portion 14a. The wedge portion 16 is provided with a flat, annular, inclined wedging surface 16a which is in mated engagement with the three inclined surfaces 14d on the shoes 14.

A spring 17 is secured within the casing 11 and is engaged at one end against the wedge ring 16 to hold the wedge ring against the wedge portions 14a for urging the friction facings 15 in frictional shock dampening engagement against the casing wall surface 11d. The opposite end of the compression spring is engaged against a spring retainer 18 that is mounted on the plunger rod 12. A movable yoke member 19 has a yoke ring 20 secured in assembly therewith by welds or the like and the yoke ring 20 is threaded at 20a in assembly on the outer end of the plunger rod 12. A cotter pin 21 extends through the yoke ring 20 and into the plunger rod 12 for locking these components in assembly together.

Disposed on an opposite end of the casing 11 is a bearing member 22 having a stub shaft 22a that is co-axially aligned with the plunger rod 12 and which is secured in fixed assembly with the bottom of the cup-shaped casing or with the casing closure ring 11b. The bearing member stub shaft 22a can be secured with the casing closure ring 11b by any suitable means such as welds and the like.

A cap retainer ring 23 is welded at 24 in assembly with the casing 11 about its radially outer surface. An open ended retainer cap 25 is secured in threaded assembly at 26 with the cap retainer ring 23. A groove pin 25′ is provided for locking the ring 23 and the cap 25 in threaded assembly together.

Mounted interiorly of the casing 11 and interiorly of the cap 25 is a sliding retainer bushing or ring 27. The bushing 27 has a radially extending annular collar flange 27a which is normally bottomed against an axially outer end 23a of the cap retainer ring 23. This bushing 27 is maintained in bottomed engagement against the cup retainer ring wall 23a while the plunger rod 12 absorbs a compression force as shown in FIGURE 3. When the plunger rod 12 is extended in an opposite direction, as shown in FIGURE 4, the shoes 12 engage the bushing retainer 27 causing the bushing retainer flange 27a to be disengaged from its seat 23a.

Also disposed within the open ended retainer cap 25, according to important features of this invention is a resilient bumper ring 30. The bumper ring 30 may be comprised of any suitable elastomeric material having the resilient characteristics of rubber and excellent results may be obtained where rubber is employed. The ring 30 includes a rubber annulus 30a which is secured at its axially outer end to a metal ring 30b in bonded assembly therewith. Suitable glue or other material may be employed for securing the rings 30a and 30b in assembly together. The bumper ring 30 is formed in such a way that the rubber portion thereof is disposed in axial engagement with the bushing retainer flange 27a.

A stroke control ring 31 is disposed on an axially outer side of the bumper ring 30 and the ring 31 has a ring flange 31a including an inner circular face 31c that is engaged with the metal ring 30b of the bumper ring 30. The stroke control ring 31 further has an axially outer face 31d that is engaged at its radially outer end against an inner face 25a of an inturned cap ring portion or abutment 25b. The yoke or plunger rod 12 has a shoulder 34 disposed opposite a radially inner end of the face 25a for engagement therewith where the means 13 is insufficient to dampen the compression force applied to the yoke 19 and the plunger rod 12. Where the compression force applied to the yoke and the plunger rod causes the shoulder 34 to strike the stroke control ring 31, as shown in FIGURE 2 or the rubber ring 30 in the modified form shown in FIGURE 5, the rubber 30a is compressed as shown in FIGURE 3 to effect dampening of the compressive force. When a pull-out force is applied to the plunger rod 12 through the yoke 19 and the means 13 is insufficient to dampen the force, the shoes 14 are caused to engage the sliding retainer bushing or ring 27 and move the ring 27 against the rubber ring 30 to dampen the pull-out force. The snubber shown in FIGURE 5 operates in the same manner for dampening pull-out forces. The spring 17 serves to maintain a fixed force against the shoes and the spring moves in fixed relationship with the shoes and the wedge bolt at all times.

The means 13 operates in the manner defined in the aforesaid U.S. patent. Compression forces are dampened by the means 13 as a result of the spring being urged against the wedge ring 16 which in turn radially spreads the shoes 14 and causes the linings 15 to frictionally engage against the inner cylindrical wall of the casing 11. Where a pull-out force is applied to the plunger rod 12, the rod surfaces 12b cause the shoes to spread so that the lining 15 will frictionally engage the inner casing wall and dampen the pull-out force.

Shown in FIGURE 5 is a modified type of snubber 10'. The components of the snubber 10' have been identified by the same reference numerals as the components of the snubber 10 since they are identical. The only difference between the snubbers 10 and 10' is that the position of the stroke control ring 31 has been changed on the snubber 10' to permit the plunger rod 12 to travel a greater distance before the two-way snubber ring 30 is activated to dampen the force applied thereagainst.

It will be understood that modifications and variations may be effected without departing from the scope of the novel concepts of the present invention.

I claim as my invention:
1. A friction snubber adapted to be connected between a pair of relatively movable members comprising:
    a casing,
    a plurality of friction shoes in said casing relatively movable in frictional engagement therewith,
        each of said shoes having a pair of convergingly inclined camming surfaces extending inwardly relative to said casing,
    a plunger rod extending into said casing co-axially from one end of said casing and having an inner head end forming an inclined surface engaging each of said friction shoes and having an opposite end,
    a wedge ring mounted co-axially of said plunger rod having an inclined camming surface complementally engaging the other inclined camming surface on each of said friction shoes,
        said casing and said plunger rod being relatively axially movable,
    means urging said wedge ring against said shoes and said shoes against said casing,
    an open ended retainer cap secured to said casing,
    a sliding retainer bushing engageable at one end by said shoes, and
    a resilient bumper ring of elastomeric material mounted co-axially of said plunger rod and disposed axially between said retainer bushing and said cap with said plunger rod being movable in one direction during a compression stroke and with said opposite end being movable with said plunger rod and operatively engageable against said resilient bumper ring for resisting compression shock forces and with the plunger rod being movable in an opposite direction during a pull-out stroke for causing said shoes to urge said sliding retainer bushing against said resilient bumper ring for resisting pull-out shock forces.

2. A self-contained friction snubber adapted to be connected between a pair of relatively movable members comprising:
    a hollow cylinder,
    a plurality of friction shoes concentrically mounted within said cylinder,
        each shoe having an outer arcuately shaped surface adapted to engage portions of the inner arcuately shaped surface of the cylinder, the inner surface of said shoes each having a pair of relatively inclined, radially directed, wedging surfaces projecting therefrom,
    a plunger rod having one end thereof extending into the cylinder through an open end thereof and arranged concentrically within the friction shoes,
        said rod having an enlarged portion on said one end thereof formed with inclined wedging surfaces engaging one of the inclined wedging surfaces on each friction shoe,
    a wedge ring encircling the plunger rod and arranged within said cylinder having inclined wedging surfaces in abutting engagement with the other wedging surface on each friction shoe,
    a coil spring encircling the plunger rod and positioned with one end in abutting engagement with the wedging ring and extending from said wedge ring towards the other end of said rod,
    a spring retaining collar mounted on the plunger rod and positioned in abutting engagement with the other end of the coil spring and arranged so as to compress said spring against said wedge ring,
    means mounted on the outer end of the plunger rod to pivotally connect one end of the snubber to a first supporting member,
    means connected to the other end of the snubber to provide for the pivotal connection of said other end of the snubber unit to a second supporting member,
    an open ended retainer cap secured to said casing,
    a sliding retainer bushing engageable at one end by said shoes, and
    a resilient bumper ring of elastomeric material mounted co-axially of said plunger rod and disposed axially between said retainer bushing and said cap with said plunger rod being movable in one direction during a compression stroke and with said means on the outer end of the plunger rod being movable with said plunger rod and engageable against said resilient bumper ring for resisting shock and with the plunger rod being movable in an opposite direction during a pull-out stroke for causing said shoes to urge said sliding retainer bushing against said resilient bumper ring for resisting shock.

3. A friction snubber adapted to be connected between a pair of relatively movable members comprising:
    a casing,
    a plunger rod extending into said casing co-axially from one end of said casing and having means between said plunger and said casing for frictionally resisting compression and pull-out forces applied to said plunger rod, said casing and said plunger rod being relatively axially movable, an open ended retainer cap secured to said casing and with said plunger rod being movable reciprocally through the open end of said cap, a sliding retainer bushing disposed within said casing and engageable at one end by a portion of said means, and a resilient bumper ring of elastomeric material mounted co-axially of said plunger rod and disposed axially between said retainer bushing and said cap with said plunger rod being movable in one direction during a compression stroke and with said plunger carrying means having a portion movable with said plunger rod and operatively engageable against said resilient bumper ring for further resisting compression shock forces and with the plunger rod being movable in an opposite direction during a pull-out stroke for causing said means to urge said sliding retainer bushing against said resilient bumper ring for further resisting pull-out shock forces.

4. A friction snubber adapted to be connected between a pair of relatively movable members comprising:

a casing, a plunger rod extending into said casing co-axially from one end of said casing and having means between said plunger and said casing for frictionally resisting compression and pull-out forces applied to said plunger rod, said casing and said plunger rod being relatively axially movable, an open ended retainer cap secured to said casing and with said plunger rod being movable reciprocally through the open end of said cap, a sliding retainer bushing disposed within said casing and engageable at one end by a portion of said means, and a resilient bumper ring of elastomeric material mounted co-axially of said plunger rod and disposed axially between said retainer bushing and said cap with said plunger rod being movable in one direction during a compression stroke and with said plunger carrying means having a portion movable with said plunger rod and operatively engageable against said resilient bumper ring for further resisting compression shock forces and with the plunger rod being movable in an opposite direction during a pull-out stroke for causing said means to urge said sliding retainer bushing against said resilient bumper ring for further resisting pull-out shock forces, said resilient bumper ring being comprised of rubber and metal rings in bonded assembly together.

5. A friction snubber adapted to be connected between a pair of relatively movable members comprising:

a casing, a plunger rod extending into said casing co-axially from one end of said casing and having means between said plunger and said casing for frictionally resisting compression and pull-out forces applied to said plunger rod, said casing and said plunger rod being relatively axially movable, an open ended retainer cap secured to said casing and with said plunger rod being movable reciprocally through the open end of said cap, a sliding retainer bushing disposed within said casing and engageable at one end by a portion of said means, a resilient bumper ring of elastomeric material mounted co-axially of said plunger rod and disposed axially between said retainer bushing and said cap with said plunger rod being movable in one direction during a compression stroke and with said plunger carrying means having a portion movable with said plunger rod and operatively engageable against said resilient bumper ring for further resisting compression shock forces and with the plunger rod being movable in an opposite direction during a pull-out stroke for causing said means to urge said sliding retainer bushing against said resilient bumper ring for further resisting pull-out shock forces, and stroke control means on said snubber for varying the length of stroke of the plunger rod for altering the space interval before said resilient bumper ring commences resisting forces applied thereagainst.

6. A friction snubber adapted to be connected between a pair of relatively movable members comprising:

a casing, a plunger rod extending into said casing co-axially from one end of said casing and having means between said plunger and said casing for frictinoally resisting compression and pull-out forces applied to said plunger rod, said casing and said plunger rod being relatively axially movable, an open ended retainer cap secured to said casing and with said plunger rod being movable reciprocally through the open end of said cap, a sliding retainer bushing disposed within said casing and engageable at one end by a portion of said means, a resilient bumper ring of elastomeric material mounted co-axially of said plunger rod and disposed axially between said retainer bushing and said cap with said plunger rod being movable in one direction during a compression stroke and with said plunger carrying means having a portion movable with said plunger rod and operatively engageable against said resilient bumper ring for further resisting compression shock forces and with the plunger rod being movable in an opposite direction during a pull-out stroke for causing said means to urge said sliding retainer bushing against said resilient bumper ring for further resisting pull-out shock forces, and stroke control means on said snubber for varying the length of stroke of the plunger rod for altering the space interval before said resilient bumper ring commences resisting forces applied thereagainst, and said stroke control means comprising a stroke control ring disposed axially between said sliding retainer bushing and said means.

7. A friction snubber adapted to be connected between a pair of relatively movable members comprising:

a casing, a plunger rod extending into said casing co-axially from one end of said casing and having means between said plunger and said casing for frictionally resisting compression and pull-out forces applied to said plunger rod, said casing and said plunger rod being relatively axially movable, an open ended retainer cap secured to said casing and with said plunger rod being movable reciprocally through the open end of said cap, a sliding retainer bushing disposed within said casing and engageable at one end by a portion of said means, a resilient bumper ring of elastomeric material mounted co-axially of said plunger rod and disposed axially between said retainer bushing and said cap with said plunger rod being movable in one direction during a compression stroke and with said plunger carrying means having a portion movable with said plunger rod and operatively engageable against said resilient bumper ring for further resisting compression shock forces and with the plunger rod being movable in an opposite direction during a pull-out stroke for causing said means to urge said sliding retainer bushing against said resilient bumper ring for further resisting pull-out shock forces, and stroke control means on said snubber for varying the length of stroke of the plunger rod for altering the space interval before said resilient bumper ring commences resisting forces applied thereagainst, said stroke control means comprising a stroke control ring disposed axially between said resilient bumper ring and said open end of said cap and engageable by said means carried by said plunger comprising said resilient bumper ring.

8. A friction snubber comprising:
a casing,
a plurality of friction shoes in said casing relatively movable in frictional engagement therewith,
each of said shoes having a pair of convergingly inclined camming surfaces extending inwardly relative to said casing,
a plunger rod extending into said casing co-axially from one end of said casing and having an inner head end forming an inclined surface engageable with each of said friction shoes and having an opposite end,
a wedge ring mounted co-axially of said plunger rod having an inclined camming surface complementally engageable with the other inclined camming surface on each of said friction shoes,
said casing and said plunger rod being relatively axially movable,
means urging said wedge ring against said shoes and said shoes against said casing,
a sliding retainer bushing connected with said casing engageable at one end by said shoes, and
a resilient bumper ring of elastomeric material mounted co-axially of said plunger rod and operatively connected with said casing and being engaged on one side by said bushing with said plunger rod being movable in one direction during a compression stroke and with means on said plunger rod being movable with said plunger rod and engageable against said resilient bumper ring for resisting compression shock forces and with the plunger rod being movable in an opposite direction during a pull-out stroke for causing said shoes to urge said sliding retainer bushing against said resilient bumper ring for resisting pull-out shock forces.

9. A shock absorber comprising:
a cylindrical casing,
a plunger rod mounted within the casing,
friction resisting means mounted between said plunger rod and an interior wall of said casing for resisting compression and pull-out shock forces,
the casing having a housing at one end,
a resiliently compressible bumper ring defining a two-way plunger stop mounted concentrically within the housing about the rod,
said plunger rod having a shoulder engageable against said resiliently compressible bumper ring for compressing the ring when the compression force applied to the plunger rod is of such magnitude that it cannot be completely absorbed by said friction resisting means, and
a slidable element mounted within the housing in concentric relation with respect to the resilient bumper ring and actuated by said friction resisting means upon the application of a pull-out force to said plunger rod for compressing the resiliently compressible bumper ring to resist pull-out forces which are of such magnitude that they cannot be completely resisted by said friction resisting means.

10. A shock snubber comprising:
a casing,
a plunger rod mounted within the casing,
shock resisting means mounted in said casing for resisting compression and pull-out shock forces,
a resiliently compressible bumper ring operatively connected with said casing and defining a two-way plunger stop mounted concentrically about the rod,
said plunger rod having a shoulder engageable against said resiliently compressible bumper ring for compressing the ring where the compression force applied to the plunger rod is of such magnitude that it cannot be completely absorbed by said shock resisting means, and
a slidable element mounted within the housing in concentric relation with respect to the resilient bumper ring and operatively connected with said plunger rod only upon the application of a pull-out force to said plunger rod for compressing the resiliently compressible bumper ring to resist pull-out forces which are of such magnitude that they cannot be completely resisted by said shock resisting means.

References Cited in the file of this patent

UNITED STATES PATENTS

| | | |
|---|---|---|
| 2,010,623 | Bugatti | Aug. 6, 1935 |
| 2,705,633 | Potter et al. | Apr. 5, 1955 |
| 2,844,366 | Butterfield | July 22, 1958 |

FOREIGN PATENTS

| | | |
|---|---|---|
| 1,004,939 | Germany | Mar. 21, 1957 |
| 1,181,201 | France | Jan. 5, 1959 |